No. 614,445. Patented Nov. 22, 1898.
J. DUDEK.
BREECHY CATTLE YOKE.
(Application filed Apr. 29, 1898.)
(No Model.)
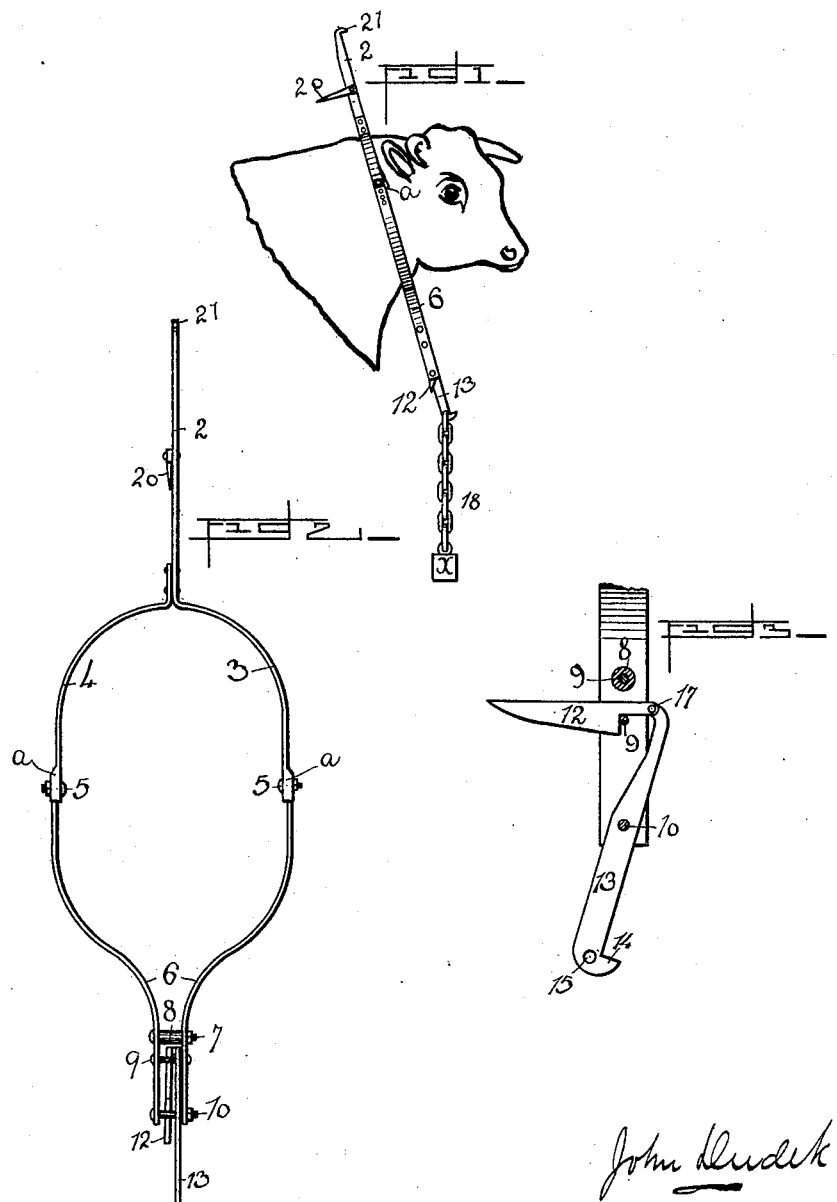

UNITED STATES PATENT OFFICE.

JOHN DUDEK, OF CAMPBELL, NEBRASKA.

BREECHY-CATTLE YOKE.

SPECIFICATION forming part of Letters Patent No. 614,445, dated November 22, 1898.

Application filed April 29, 1898. Serial No. 679,272. (No model.)

*To all whom it may concern:*

Be it known that I, JOHN DUDEK, residing at Campbell, in the county of Franklin and State of Nebraska, have invented certain useful Improvements in Breechy-Cattle Yokes; and I do hereby declare that the following is a full, clear, and exact description of the invention, such as will enable others skilled in the art to which it appertains to make and use the same, reference being had to the accompanying drawings, which form a part of this specification.

This invention has relation to an improved yoke to be used in connection with breechy cattle, the object of my invention being to provide a device which will prevent breechy cattle from attempting to escape through fencing.

In the accompanying drawings I have shown, in Figure 1, the head of a steer provided with my breechy-cattle yoke. Fig. 2 shows a front view of the yoke with a portion broken away, while Fig. 3 shows a broken enlarged detail of the lower barb.

My invention embodies, essentially, two semicircular yoke-sections 3 and 4, the section 3 being provided with the extension 2, which terminates in the hook 21. The yoke-section 4 is secured to this upward extension 2 by any suitable means. These yoke-sections 3 and 4 are further provided with a lateral extension $a$, as is shown in Figs. 1 and 2, adjacent to which are pivoted the curved lower yoke-sections 6 6, which sections are held by means of the bolts 5 to form a hinge, so that the upper sections 3 and 4 may fold down and upon the lower sections 6 6 in one direction, but are locked and prevented from turning in an opposite direction by the lateral extension $a$, riding upon the section 6, and so forming a stop. The lower frame-sections 6 6 are secured by means of the bolts 7 and 10, as shown in Fig. 2. A bolt 9 is positioned between bolt 7 and 10, upon which rides the narrow neck portion of the prong 12, which neck portion acts as a stop to this prong when the same is brought into a horizontal position, as shown in Fig. 3. Pivotally secured to the lower bolt 10 is a lever 13, provided with the outwardly-extending hook 14, and which lever has its upper end curved and is pivoted to the prong 12 in such a manner that when said lever 13 hangs in its normal approximately vertical position said prong is in a pendent condition. However, as soon as this lever 13 is carried backward the prong 14 is raised into a horizontal position, as is shown in Fig. 3, so as to act as a spur against which the animal will press should it try to force its way between the strands of a wire fence or between the bars of an ordinary fence. Pendent from the lever 13 is an ordinary weighted chain 18, which acts in retaining the lever 13 in a proper position as well as aiding in holding the cattle-yoke properly upon the animal's neck. This chain, further, will prevent the animal from working through obstructions, as it would catch in the same and carry out the spur to prick and punish the animal. Should the animal encounter an obstruction above its head, the upper hinged yoke-sections 3 and 4 would be carried back, so that the bar 2 would ride upon the animal's neck, and this bar 2 is provided with the spur 20, fixed to it, so that this spur would prick the animal upon the upper portion of its neck. From this it will be seen that my yoke comprises two pivoted sections, the upper sections 3 and 4 being provided with laterally-extending ears $a$, which prevent the upper section falling over the animal's head while grazing, so that while the neck-yoke is normally supported upon the animal's neck by means of the upper curved bars 3 and 4 the lower form practically a continuation thereof.

Now should an animal provided with one of my improved cattle-yokes attempt to break through a fence in stepping over the same the chain 18 would come in contact with the fence, and as soon as that occurred the lower barb 12 would be thrown upward into a horizontal position to stab the animal in the breast as the bar 13 was carried out of its normal position. The animal, however, can graze and lie down, as the chain 18 in no way interferes with the bar 12. Should the animal try to force its head through the fence, so that the upper bar 2 should be engaged, the upper prong 20 would be forced rearward into the animal's neck. Of course where both upper bar 2 and the lower bar are simultaneously engaged both prongs enter the neck of the animal, one above and the other below.

The device is simple and effective, and,

Having thus described my said invention, what I desire to secure by United States Letters Patent is—

1. The combination with a yoke comprising two half-sections pivotally connected, of a prong pivotally secured within the lower portion of said yoke, a lever pivoted within the lower portion of said yoke, and pivoted to said prong, and a support for said prong, as and for the purpose set forth.

2. The combination with a cattle-yoke comprising upper and lower end sections, an upwardly-extending bar secured to said upper section, a prong extending from said bar, a lever pivoted within the lower portion of said yoke, a prong pivotally connected to said lever, a pin supporting said prong and a chain extending from said lever, all arranged substantially as and for the purpose set forth.

3. In a breechy-cattle yoke the combination of the following instrumentalities to wit: the lower bars 6, 6, the bolts 9 and 10, securing the same, the bar 13, pivotally secured to said bolt 10, the prong 12, pivotally secured to said bar 13, and supported by said bolt 9, said bar 13, being provided with the extending hook 14, the weighted chain 18, extending from said bar 13, the upper yoke-section comprising the bars 3 and 4, pivotally connected to said bars 6, said bars 3 and 4 being provided with the ears $a$, the extension 2, forming part of the bar 3 and terminating in the hook 21, and the prong 20 secured to said prong 2, as and for the purpose set forth.

In testimony whereof I affix my signature in presence of two witnesses.

JOHN DUDEK.

Witnesses:
 G. W. SUES,
 MAMIE MARR.